(12) United States Patent
Forster et al.

(10) Patent No.: US 11,971,483 B2
(45) Date of Patent: *Apr. 30, 2024

(54) POSITIONAL TRACKING SYSTEM AND METHOD

(71) Applicant: BLACK & DECKER INC., New Britain, CT (US)

(72) Inventors: Scott M. Forster, Westminster, MD (US); Christopher R. Walter, Parkville, MD (US); Craig A. Schell, Street, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,884

(22) Filed: Jun. 24, 2022

(65) Prior Publication Data
US 2022/0326381 A1    Oct. 13, 2022

Related U.S. Application Data (63) Continuation of application No. 16/416,962, filed on May 20, 2019, now Pat. No. 11,402,507.

(60) Provisional application No. 62/757,840, filed on Nov. 9, 2018.

(51) Int. Cl.
*G01S 17/10* (2020.01)
*G01C 15/00* (2006.01)
*G01S 17/66* (2006.01)
*G03H 1/04* (2006.01)

(52) U.S. Cl.
CPC ............ *G01S 17/10* (2013.01); *G01C 15/002* (2013.01); *G01S 17/66* (2013.01); *G03H 1/041* (2013.01); *G03H 1/0465* (2013.01)

(58) Field of Classification Search
CPC ....... G01S 17/10; G01S 17/66; G01C 15/002; G03H 1/041; G03H 1/0465
See application file for complete search history.

(56) References Cited

U.S. PATENT DOCUMENTS

2018/0202805 A1* 7/2018 Unger .................. G01S 7/4813

* cited by examiner

*Primary Examiner* — Nam D Pham
(74) *Attorney, Agent, or Firm* — Adan Ayala (57) ABSTRACT

A position tracking system has a laser transmitter, a control tracker and a layout indicator. The laser transmitter has a laser for emitting a laser beam, a controller controlling the laser, and a motor for rotating the emitted laser beam. The control tracker has a housing, at least two photo diodes disposed on the housing, and a laser assembly for generating a beam to be projected unto a surface. The layout indicator has a housing, and at least two photo diodes disposed on the housing. A network server communicates with at least one of the laser transmitter, the control tracker and the layout indicator.

7 Claims, 9 Drawing Sheets

POSITIONAL TRACKING SYSTEM AND METHOD

CROSS-REFERENCE TO RELATED APPLICATIONS

The following application derives priority from U.S. Application Ser. No. 62/676,375, filed on May 25, 2018 and titled "POSITIONAL TRACKING SYSTEM AND METHOD", U.S. Application Ser. No. 62/726,679, filed on Sep. 4, 2018 and titled "POSITIONAL TRACKING SYSTEM AND METHOD", and U.S. Application Ser. No. 62/757,840, filed on Nov. 9, 2018 and titled "POSITIONAL TRACKING SYSTEM AND METHOD", which are incorporated herein by reference.

FIELD

The present invention relates to a positional tracking system and method, and more particularly to optics-based positional tracking systems and methods for locating objects and locations in a construction jobsite.

BACKGROUND

It is well known to use laser measuring systems to locate different points throughout a construction jobsite. One established laser measuring technique and measuring system utilizes a projection of a laser beam by a rotary irradiation (e.g., a laser transmitter) for the purpose of forming a horizontal reference plane or a reference plane tilted with respect to the horizontal reference plane at a predetermined angle and by which it is possible to measure a position by using the transmitted laser beam. In this way, the applicable measuring instruments measure the coordinates of a point by sending a laser beam to the point. The laser beam may impinge directly on the point or may impinge on a retro reflector target that is contact with the point. The measuring instruments determine the coordinates of the point by measuring the distance and two angles to the target. For example, in U.S. Pat. Nos. 7,196,302, 7,966,739 and 8,788,154, laser surveying and laser measuring systems are described that utilize N-beams in combination with certain photo detection techniques to measure positional data.

However, while the aforementioned systems provide highly accurate results, the ability to utilize multiple, independent laser receivers to simultaneously calculate positions remains a challenge. Accordingly, when locating points in a construction jobsite, it is typical for only one person to move the laser receiver from point to point. In order to ensure that the laser receiver is placed in the correct location, the person would typically have to work at least 5 minutes on ensuring the correct location.

Therefore, a need exists for a three dimensional (3D) measuring system that allows for the use of multiple, independent laser receivers to simultaneously calculate positions without any need to communicate with the laser transmitter. Furthermore it is desirable to have six degrees of freedom ("6DOF") positions of multiple rigid objects, or of at least one an element or physical feature in one object.

Certain positional tracking systems currently known in the art fully or partially rely on tracking markers attached to objects, and then track the marked objects. In such systems, a tracked object typically must be covered with large tracking markers that can encode several bits of data, such that typically only large objects can be tracked.

Advances in computer vision algorithms have made it possible to do away with tracking markers in limited scenarios by using natural image/scene features instead. Unfortunately, current tracking algorithms that rely on natural image features are typically not robust/precise enough to work consistently in many construction jobsite environments, which often contain transparent, shiny, and/or textureless objects. Extracting and identifying natural features from images also tends to be computationally expensive.

DESCRIPTION OF THE DRAWINGS

Preferred embodiments of the invention will now be described, by way of example, with reference to the accompanying drawings, of which:

FIGS. 4A-4B are block diagrams of the control tracker, where

DETAILED DESCRIPTION

Figure 1:
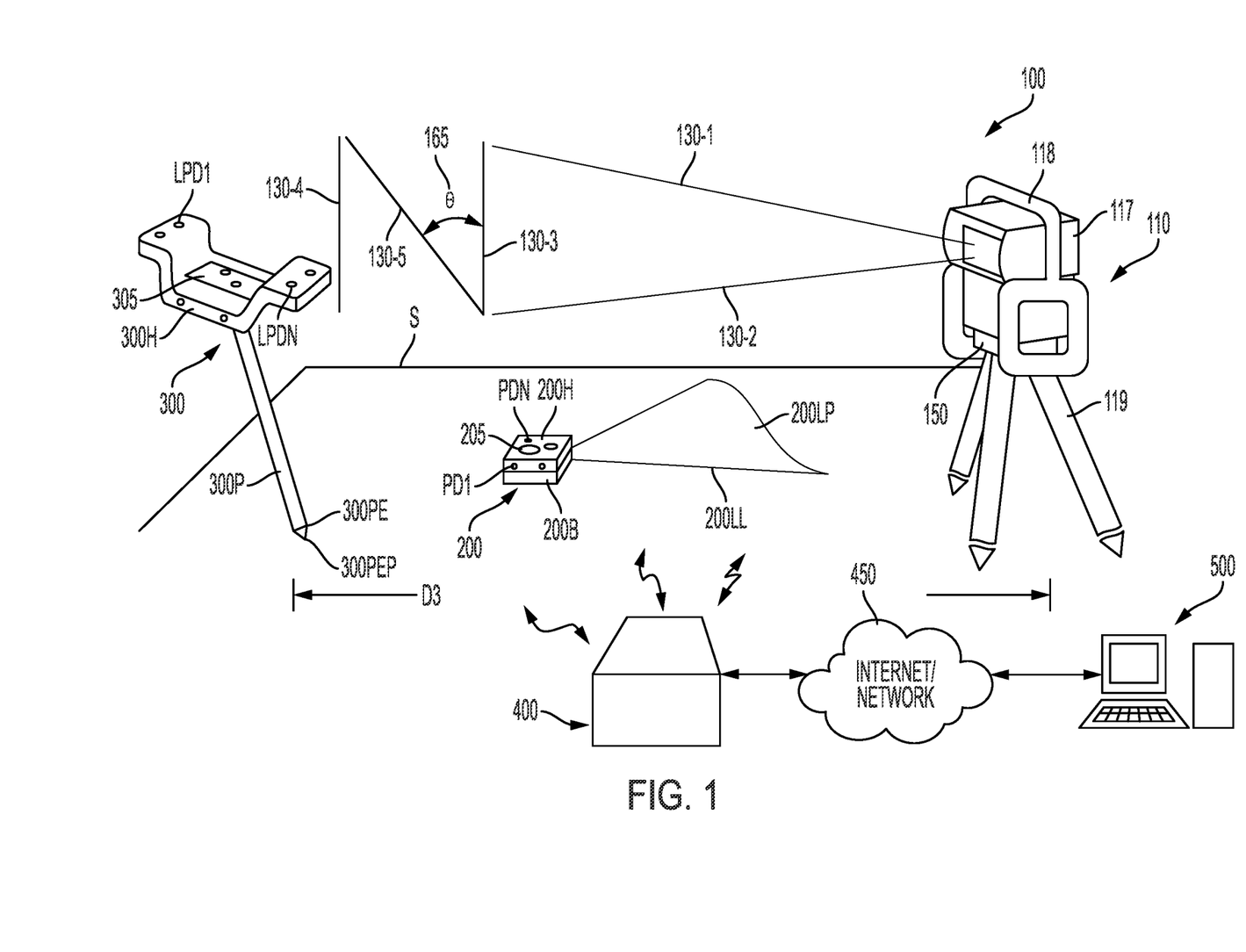
FIG. 1 is a perspective view of a first embodiment of the positional tracking system.

FIG. 1 shows a perspective view of a positional tracking system 100, which preferably includes a laser transmitter 110, a control tracker 200, a layout indicator 300, and a local server 400 in communication with at least one of the laser transmitter 110, the control tracker 200, and/or the layout indicator 300. The local server 400 may be in communication with a remote server or computing device 500 via a communication network 450, such as the internet, the cellular network, etc.

Figure 2:
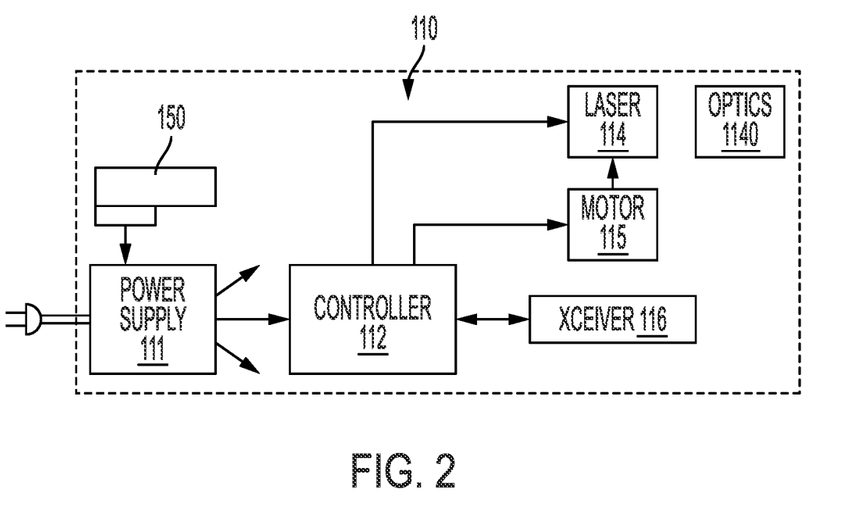
FIG. 2 is a block diagram of the laser transmitter.

Referring to FIG. 2, laser transmitter 110 may have a power supply 111, which accepts AC power or power from a power tool battery pack 150 connected thereto, which supplies power to different components of laser transmitter 110. Laser transmitter 110 may also include a controller 112, a motor 115, a laser 114, a transceiver 116, all preferably powered by power supply 111. Laser 114 shall emit a laser beam as discussed in more detail below. Optics 1140 may be disposed adjacent to laser 114 to modify the emitted laser beam. Controller 112 may be connected to laser 114 for controlling on-time and/or pulsing of laser 114.

Motor 115 may be connected to laser 114 and/or optics 1140 for rotating or oscillating the emitted laser beam. Preferably, the laser 114 and/or optics 1140 may be rotated at least 360 degrees so as to sweep the emitted laser beam around the jobsite, though persons skilled in the art will recognize that the laser 114 and/or optics 1140 may be rotated through a smaller angle. Controller 112 may be connected to motor 115 for controlling the speed and direction of the motor rotation, thus controlling the speed and direction of the moving laser beam.

Controller 112 may also be connected to a transceiver 116 for receiving and/or transmitting data and communication messages. Such data and communication messages may be sent or received via one or more of a variety of wireless technologies, including: wireless local area network (WLAN) technologies; wireless personal area network (WPAN) technologies (including low-rate wireless personal area network (LR-WPAN) technologies); radio frequency identification (RFID); ultra-wideband (UWB); ultrasound; sound; infrared; visible light; camera vision, etc. Included in WLAN technologies are those conforming to the Institute of Electrical and Electronics Engineers (IEEE) 802.11 series of standards (e.g. Wi-Fi™). Included in WPAN and LR-WPAN technologies are those conforming to the IEEE 802.15 series of standards (e.g. Bluetooth™, ZigBee™, etc.).

At least one or more of the power supply 111, the power tool battery pack 150, the controller 112, the motor 115, the laser 114, and/or the transceiver 116 are preferably disposed in a housing 117, which may be further protected by a protective bar 118. Housing 117 may be disposed on a tripod 119.

Figure 4A:
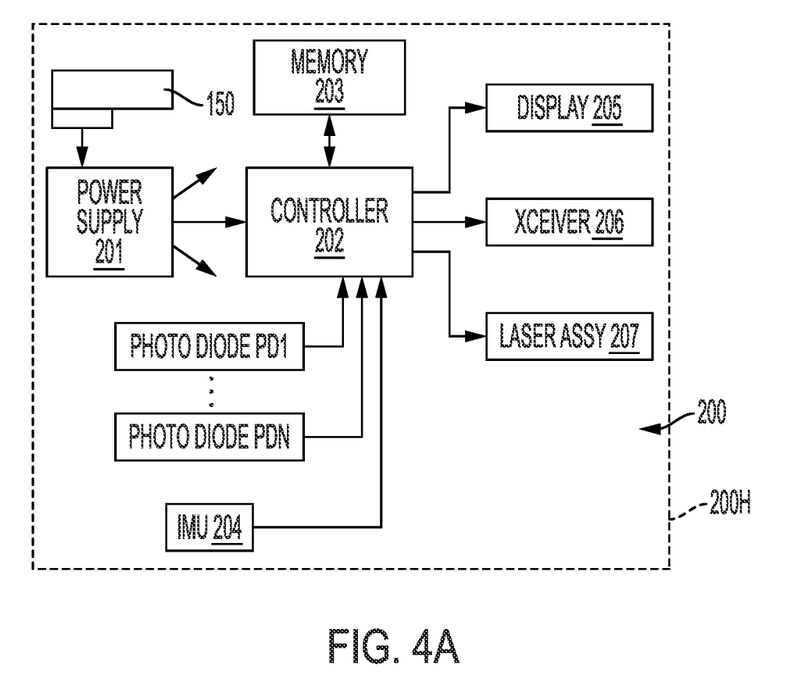
FIG. 4A is a block diagram of the main components in the housing and FIG. 4B is a block diagram of the main components in the base body.

Referring to FIGS. 1 and 4A, control tracker 200 may have a housing 200H. Control tracker 200 may also have a power supply 201, which accepts power from a power tool battery pack 150 connected thereto, which supplies power to different components of control tracker 200. Control tracker 200 may also include a controller 202, a memory 203 connected to controller 202, an inertial measurement unit (IMU) sensor 204 providing information to controller 202, a display 205 connected to controller 202, a transceiver 206, and a laser assembly 207, all preferably powered by power supply 201. Preferably display 205 is a touch-screen display that can display information as well as be used as an input interface, which is then sent to controller 202.

Multiple photo diodes PD1-PDN may be disposed on housing 200H, preferably on different faces and/or orientations of housing 200H. Such photo diodes PD1-PDN are preferably connected to controller 202 and can indicate when they have been lighted by a laser beam originating from laser transmitter 110.

Controller 202 may also be connected to the transceiver 206 for receiving and/or transmitting data and communication messages. Such data and communication messages may be sent or received via one or more of a variety of wireless technologies, including: wireless local area network (WLAN) technologies; wireless personal area network (WPAN) technologies (including low-rate wireless personal area network (LR-WPAN) technologies); radio frequency identification (RFID); ultra-wideband (UWB); ultrasound; sound; infrared; visible light; camera vision, etc. Included in WLAN technologies are those conforming to the Institute of Electrical and Electronics Engineers (IEEE) 802.11 series of standards (e.g. Wi-Fi™). Included in WPAN and LR-WPAN technologies are those conforming to the IEEE 802.15 series of standards (e.g. Bluetooth™, ZigBee™, etc.).

Control tracker 200 preferably has laser assembly 207 for projecting a laser beam plane 200LP unto a surface S. A laser line 200LL is shown on the surface S, where laser beam plane 200LP intersects surface S. Persons skilled in the art will recognize that laser beam plane 200LP can be formed by projecting a laser beam through a curved lens (such as a cylindrical or partial cylindrical lens) or rotating a laser beam dot.

Figure 5:
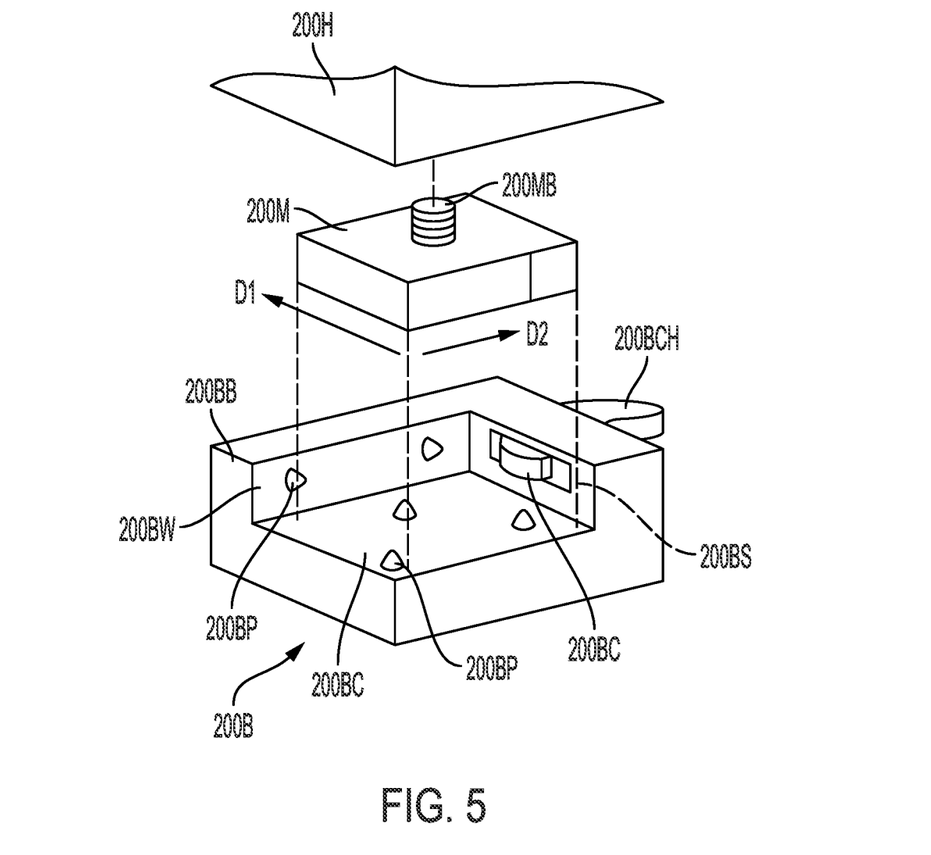
FIG. 5 is a partial exploded view of components of a first embodiment of the control tracker.

Referring to FIGS. 1 and 5, the housing 200H is disposed on a base 200B that can be affixed to the floor or an object. Base 200B may have a base body 200BB and a mount body 200M disposed on base body 200BB. Mount body 200M may have a bolt 200MB extending therefrom for threadingly engaging housing 200H.

Preferably base body 200BB has a 3-2-1, or six-point, locational system to fix the location of mount body 200M (and thus of housing 200H). As seen in FIG. 5, the base body 200BB has a floor 200BF for supporting mount body 200M. Floor 200BF defines a substantially horizontal support plane. Alternatively floor 200BF may have three support cones 200BP, providing three contact points for contacting mount body 200M and defining a substantially horizontal support plane.

A wall 200BW preferably extends substantially perpendicular from floor 200BF. Wall 200BW may have two support cones 200BP, providing two contact points for contacting mount body 200M and restraining movement along a first horizontal direction a1.

A second wall 200BS preferably extends substantially perpendicular both from floor 200BF and wall 200BW. Wall 200BS may have one support cone 200BP, providing one contact points for contacting mount body 200M and restraining movement along a second horizontal direction D2 substantially perpendicular to the first horizontal direction D1.

A third wall 200BSS may have a cam 200BC rotatably connected thereto, for providing one contact point for contacting mount body 200M and restraining movement along the second horizontal direction D2.

With such arrangement, if mount body 200M (and/or housing 200H) is moved, it can be easy relocated to the same position/location it was before by placing mount body 200M against support cones 200BP and cam 200BC.

Figure 8:
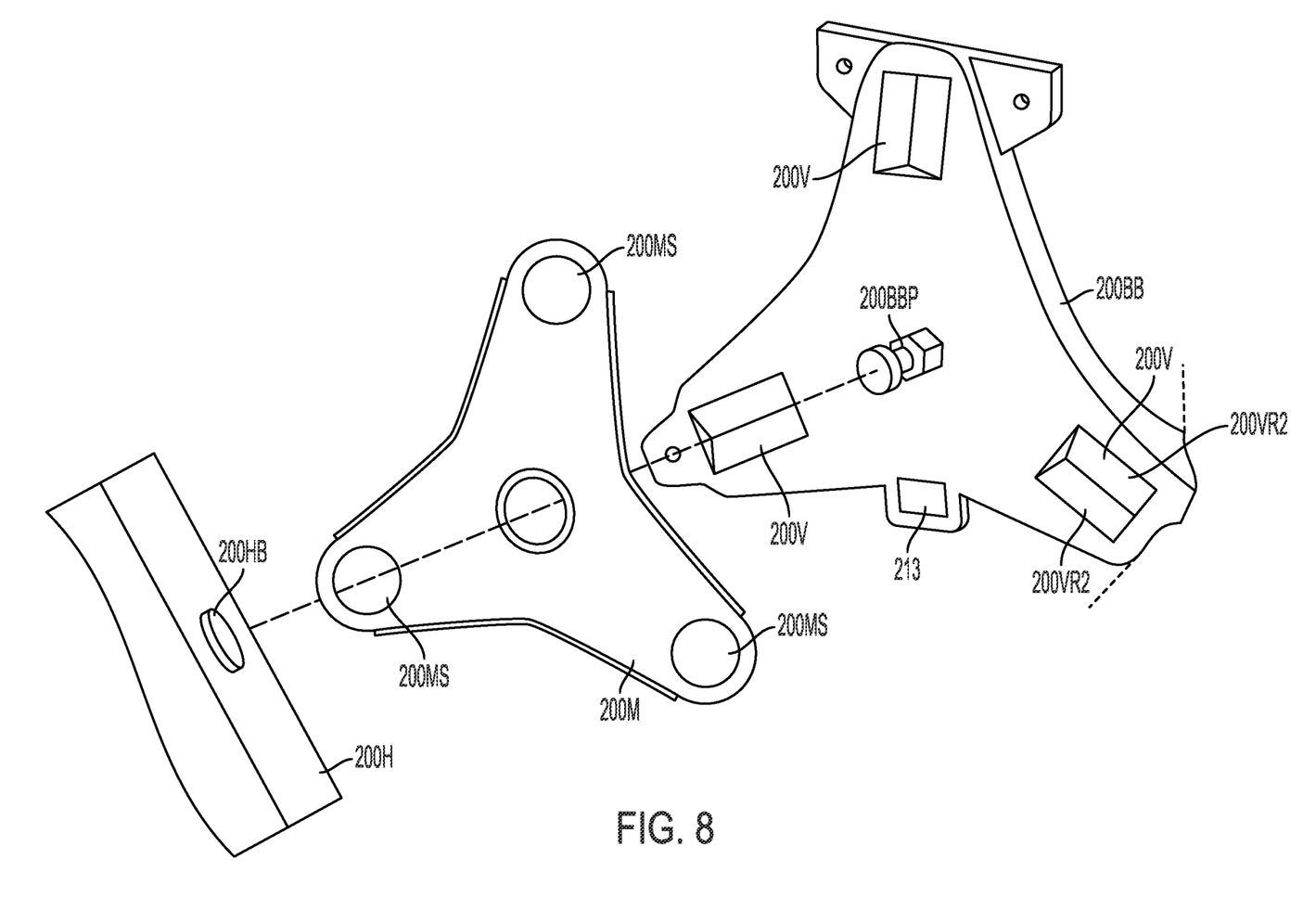
FIG. 8 is a partial exploded view of components of a second embodiment of the control tracker.
Figure 9:
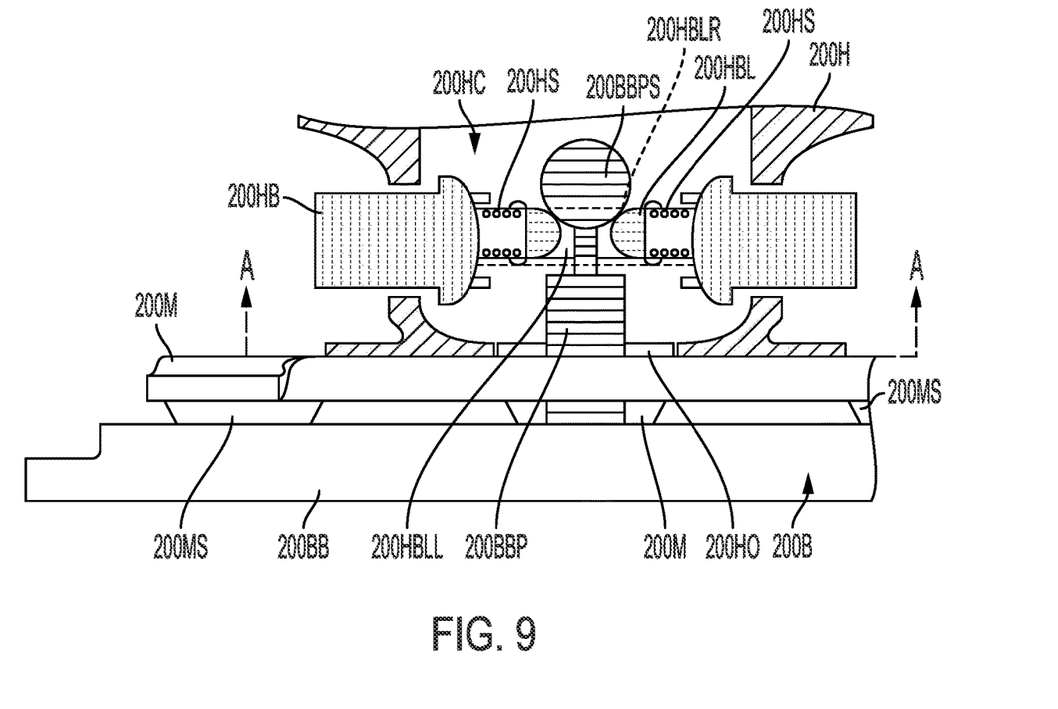
FIG. 9 is a partial cross-sectional view of components of the second embodiment of the control tracker.

FIGS. 8-9 show a second embodiment of the base 200B that can be affixed to the floor or an object. Base 200B may have a base body 200BB and a mount body 200M disposed on base body 200BB. Base body 200BB may have a post 200BBP extending therefrom for engaging housing 200H. Preferably post 200BBP extends through mount body 200M.

Base body 200BB may have a plurality of, and preferably at least three, channels 200V. Each channel 200V preferably has first and second ramps 200VR1, 200VR2, for receiving semi-spherical contacts 200MS on mount body 200M. Persons skilled in the art will recognize that each semi-spherical contact 200MS will preferably contact first and second ramps 200VR1, 200VR2 at two points. By providing three channels 200V with corresponding semi-spherical contact 200MS, it will be possible to repeatably locate mount body 200M relative to base body 200BB.

Housing 200H may be attached to mount body 200M and have an opening 200HO for allowing post 200BBP therethrough. Post 200BBP may have a spherical or semi-spherical portion 200BBPS that engages a capture mechanism 200HC on housing 200H.

Capture mechanism 200HC preferably has at least one button 200HB extending out of housing 200H. Button 200HB may be connected a latch portion 200HBL which preferably contacts the underside of portion 200BBPS. At least one spring 200HS may bias button 200HB (and/or latch portion 200HBL) towards a position where latch portion 200HBL contacts the underside of portion 200BBPS.

Preferably latch portion 200HBL has a ramp 200HBLR contacting the underside of portion 200BBPS. With such arrangement, as ramp 200HBLR is moved towards portion 200BBPS, any play between housing 200H and base body 200BB is reduced.

Persons skilled in the art will recognize that FIG. 9 shows two buttons 200HB with corresponding latch portions 200HBL. Preferably buttons 200HB and corresponding latch portions 200HBL are connected by a corresponding link 200HBLL. Springs 200HS are preferably disposed between one button 200HB and the latch portion 200HBL corresponding to the other button 200HB. With such arrangement, the user would preferably press both buttons 200HB separating latch portions 200HBL to create enough space for portion 200BPS to clear and move therethrough, in order to remove housing 200H from base body 200BB.

In order to place mount housing 200H on base body 200BB, the user would preferably press both buttons 200HB separating latch portions 200HBL to create enough space for portion 200BPS to clear and move therethrough. When the housing 200H is disposed on base body 200BB, springs 200HS force latch portions 200HBL (and thus ramps 200HBLR) against portion 200BPS, taking up any play between housing 200H and base body 200BB. Persons skilled in the art will recognize that latch portions 200HBL will each provide horizontal force vectors that would cancel out, as well as vertical force vectors that would force housing 200H downwardly against base body 200BB. Such mechanism allows a user to easily relocate housing 200H to the same position/location it was before.

Figure 4B:
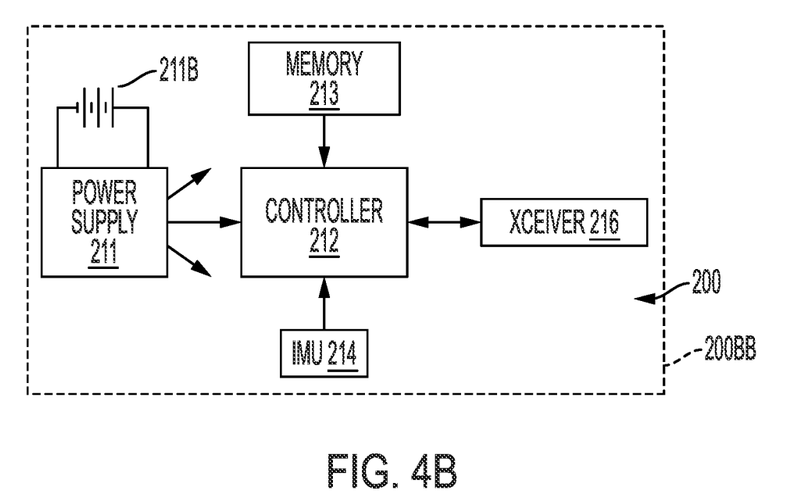

Referring to FIGS. 1, 4B and 5, base body 200BB may have a second power supply 211, which accepts power from batteries 211B, which supplies power to different components of base body 200BB. Base body 200BB may also include a controller 212, a memory 213 connected to controller 212, an inertial measurement unit (IMU) sensor 214 providing information to controller 212, and a transceiver 206. Persons skilled in the art shall recognize that memory 213 may be non-volatile memory, such as flash memory, EEPROM memory, a passive RFID tag containing a particular ID number, etc. Persons skilled in the art shall recognize that base body 200BB may have a controller 212, a memory 213 connected to controller 212, and a transceiver 206 incorporated as a RFID tag circuit. Persons skilled in the art should also recognize that other non-RFID identification methods, such as bar codes, QR codes, etc. can be used to provide base body 200BB with a particular identification number.

Controller 212 may also be connected to the transceiver 216 for receiving and/or transmitting data and communication messages. Such data and communication messages may be sent or received via one or more of a variety of wireless technologies, including: wireless local area network (WLAN) technologies; wireless personal area network (WPAN) technologies (including low-rate wireless personal area network (LR-WPAN) technologies); radio frequency identification (RFID); ultra-wideband (UWB); ultrasound; sound; infrared; visible light; camera vision, etc. Included in WLAN technologies are those conforming to the Institute of Electrical and Electronics Engineers (IEEE) 802.11 series of standards (e.g. Wi-Fi™). Included in WPAN and LR-WPAN technologies are those conforming to the IEEE 802.15 series of standards (e.g. Bluetooth™, ZigBee™, etc.).

Figure 3:
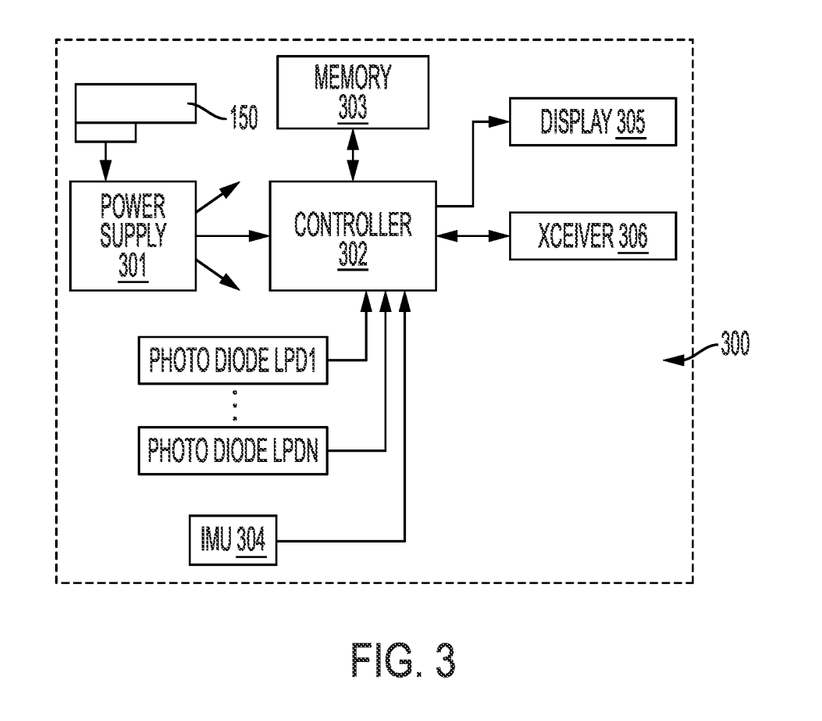
FIG. 3 is a block diagram of the layout indicator.

Referring to FIGS. 1 and 3, layout indicator 300 may have a housing 300H. Layout indicator 300 may also have a power supply 301, which accepts power from a power tool battery pack 150 connected thereto, which supplies power to different components of layout indicator 300. Layout indicator 300 may also include a controller 302, a memory 303 connected to controller 302, an inertial measurement unit (IMU) sensor 304 providing information to controller 302, a display 305 connected to controller 202, and a transceiver 306, all preferably powered by power supply 301. Preferably display 305 is a touch-screen display that can display information as well as be used as an input interface, which is then sent to controller 302.

Multiple photo diodes LPD1-LPDN may be disposed on housing 300H, preferably on different faces and/or orientations of housing 300H. Such photo diodes LPD1-LPDN are preferably connected to controller 302 and can indicate when they have been lighted by a laser beam originating from laser transmitter 110.

Housing 300H may also have a pole 300P with an end 300PE. Preferably end 300PE has a conical tip ending in a point 300PEP. Pole 300P may be extendable by adding one or more extensions between housing 300H and pole 300P. Alternatively pole 300P may be telescoping.

Controller 302 may also be connected to the transceiver 306 for receiving and/or transmitting data and communication messages. Such data and communication messages may be sent or received via one or more of a variety of wireless technologies, including: wireless local area network (WLAN) technologies; wireless personal area network (WPAN) technologies (including low-rate wireless personal area network (LR-WPAN) technologies); radio frequency identification (RFID); ultra-wideband (UWB); ultrasound; sound; infrared; visible light; camera vision, etc. Included in WLAN technologies are those conforming to the Institute of Electrical and Electronics Engineers (IEEE) 802.11 series of standards (e.g. Wi-Fi™). Included in WPAN and LR-WPAN technologies are those conforming to the IEEE 802.15 series of standards (e.g. Bluetooth™, ZigBee™, etc.).

Local server 400 may receive and/or transmit data and communication messages from and to the transceivers 116, 206, 306 laser transmitter 110, the control tracker 200, and/or the layout indicator 300, respectively. Such data and communication messages may be sent or received via one or more of a variety of wireless technologies, including: wireless local area network (WLAN) technologies; wireless personal area network (WPAN) technologies (including low-rate wireless personal area network (LR-WPAN) technologies); radio frequency identification (RFID); ultra-wideband (UWB); ultrasound; sound; infrared; visible light; camera vision, etc. Included in WLAN technologies are those conforming to the Institute of Electrical and Electronics Engineers (IEEE) 802.11 series of standards (e.g. Wi-Fi™). Included in WPAN and LR-WPAN technologies are those conforming to the IEEE 802.15 series of standards (e.g. Bluetooth™, ZigBee™, etc.).

Local server 400 is preferably connected to the internet 450 via at least one of the following connections: digital subscriber lines (DSL), asymmetric digital subscriber lines (ADSL), symmetric digital subscriber lines (SDSL), very high digital subscriber lines (VDSL), cable-broadband internet connection, wireless broadband connection, T-1 lines, bonded T-1 lines, T-3 lines, optical carrier lines (OC3), internet over satellite (IoS), etc.

Referring to FIGS. 1-2, laser transmitter 110 preferably projects V- or N-shaped beams, for example, which have a plurality of fan-shaped beams in rotary irradiation at a constant speed in a well-known fashion. Persons skilled in the art are referred to US Publication Nos. US 2017/0284790 and US 2016/0131761, and U.S. Pat. Nos. 7,196,302, 7,966,739 and 8,788,154, which are fully incorporated herein by reference, for further information on positional tracking measuring system 100 and laser transmitter 110.

The laser transmitter 110 preferably projects beams so that the cross-section of the luminous fluxes of such beams is formed in a V- or N-shape, illustratively shown as vertical beam 130-3, vertical beam 130-4 and beam 130-5 tilted at angle θ 165 on a diagonal line with respect to vertical beam 130-3 and vertical beam 130-4. As will be appreciated, while the illustrative embodiments herein are described using N-shaped beams, including the addition of two additional coordinates within the N-beam system, it will be understood that any type of laser beam that can be configured with the frequency or phase modulation data as detailed herein can also be utilized. For example, in a non-N-beam system, an embodiment would provide only the azimuthal angle and distance.

Laser transmitter 110 may modulate beams 130-3, 130-4 (either using pulse width modulation, frequency modulation or phase modulation, or other coding methodology) with data specifying an azimuth angle associated with the current position of laser transmitter 110. For example, assuming a clockwise rotation of the beams 130-3, 130-4 with a first position at 0 degrees, the on-time period of the pulse-width-modulated beams 130-3, 130-4 may be shorter when the beams 130-3, 130-4 are at 10 degrees. Such on-time period would increase as the beams 130-3, 130-4 rotated to the 20 degrees position, the 90 degrees position, etc. Preferably, there is a linear correlation between the on-time period and the angular position.

In this way, control tracker 200 and/or layout indicator 300, upon receiving the transmitted modulated laser signal at photo diodes PD1-PDN, LPD1-LPDN will be able to directly estimate its azimuthal position (i.e., an angle) by measuring the pulse width, the pulse width frequency or phase, as the case may be, of the modulated signal pulse. Further, in accordance with the embodiment, distance D3 (illustratively, the distance between laser transmitter 110 and layout indicator 300) can also be determined at layout indicator 300 using the modulated signal and signal reflections between laser transmitter 110 and layout indicator 300 (e.g., for long distances, one direct light pulse and one reflected light pulse is sufficient, and for short distances, two or more reflected light pulses are typically generated in such a configuration) to calculate time-of-flight. Persons skilled in the art shall recognize that layout indicator 300 and/or laser transmitter 110 preferably ensure that the light pulse has originated from the same laser transmitter 110. This can be accomplished by layout indicator 300 and/or laser transmitter 110 demodulating the information encoded in the laser beam, which can be used to distinguish between laser beams originating from multiple laser transmitters 110.

Persons skilled in the art will recognize that the height location of control tracker 200 and/or layout indicator 300 may be calculated by using the time differential between when photo diodes LPD1-LPDN first detect vertical beam 130-4 and tilted beam 130-5 (or when tilted beam 130-5 and vertical beam 130-6 are detected) to calculate the height location. Alternatively, the height location can be determined by examining the ratio between the measured separation of photo diodes LPD1-LPDN (due to the angular orientation of housing 300H) and the actual known separation of photo diodes LPD1-LPDN.

Because the distance D3, the height location and the angular position relative to laser transmitter 110 is known, it is possible to determine the location of control tracker 200 and/or layout indicator 300 with Cartesian coordinates. For example, by knowing the distance D3 and the azimuth angle relative to laser transmitter 110, the X- and Y-coordinates of control tracker 200 and/or layout indicator 300 can be calculated by laser transmitter 110, control tracker 200 and/or layout indicator 300. Furthermore, the height location would be the Z-coordinate.

Because layout indicator 300 would calculate height based on the position of housing 300H, it is preferable laser transmitter 110 and/or layout indicator 300 to also calculate the angle axis representations, quaternions, Euler angles or yaw/pitch/roll of housing 300H in order to know the orientation of housing 300H relative to laser transmitter 110. This can be accomplished by noting which photo diodes LPD1-LPDN are hit by the different laser beams, and the order and timing of such hits (or by examining the ratio between the measured separation of photo diodes LPD1-LPDN (due to the angular orientation of housing 300H) and the actual known separation of photo diodes LPD1-LPDN). For example, assuming housing 300H is a cube, if the photo diodes disposed on the top, front and left faces of the cube are hit by laser beams, but not the back, rear and right faces, the orientation can be generally established. By noting the order and timing in which the different photo diodes are hit by the laser beams, the exact angle axis representations, quaternions, Euler angles or yaw/pitch/roll of the cube can be calculated.

Once such calculations are completed, the exact orientation of housing 300H is known. Because the length of pole 300P is known (and in the same orientation as housing 300H), it is possible to calculate the X-, Y- and Z-coordinates of point 300PEP. Persons skilled in the art will recognize that it is preferable to provide a means for calculating the length of pole 300P when extended or adjusted and for transmitting such information to the controller 302. For example, if extensions are used, controller 302 can receive a message from the extensions being used as to the number and length of each used extension, which is then added to the length of pole 300P. If a telescoping pole 300P is adjusted, such pole 300P may have an encoder to track the adjustment movements, which are then used to calculate the length of pole 300P.

Persons skilled in the art will recognize that it is possible for layout indicator 300 to calculate the length of pole 300P by placing the point 300PEP on a fixed location, then rotating housing 300H about the point 300PEP without moving point 300PEP. Controller 302 can calculate the different positions and orientations of housing 300H and use that information to resolve for the location of point 300PEP and distance from housing 300H. Persons skilled in the art will recognize that such locational calculations are preferably made by controllers 202, 302 of control tracker 200 and layout indicator 300, respectively. However, the calculations may be conducted in local server 400 and/or laser transmitter 110, as control tracker 200 and/or layout indicator 300 may transmit the data and sensed information to local server 400 and/or laser transmitter 110.

Persons skilled in the art that a junction can be disposed on pole 300P and/or housing 300H to facilitate the disconnection and connection therebetween. For example, a user may remove a first pole 300P from housing 300H and install a second longer pole. Preferably, such connection will be a hot shoe/accessory shoe such as defined in ISO 518:2006, allowing an electrical connection between pole 300P and housing 300H.

Persons skilled in the art shall recognize that positional tracking system 100 can thus effectively calculate X-, Y- and Z-coordinates of items as well as their orientation (as represented by angle axis representations, quaternions, Euler angles or yaw/pitch/roll). This allows the user to rotate the item along six degrees of freedom (6DoF) and have the positional tracking system 100 track it accordingly.

Because the positional tracking system 100 can calculate X-, Y- and Z-coordinates of items, it can be used to locate the items and/or desired locations called for in building plans. Preferably the building plans are building information models (BIMs) specifying different locations for different features, parts, items, etc. For example, a BIM model may specify the locations where different anchors or outlets are to be placed at. Positional tracking system 100 can be used to easily identify and locate those locations.

In order to do so, it is necessary to correlate the BIM model to the physical jobsite. The BIM model can be loaded unto the memories 203, 303 of control tracker 200 and/or layout indicator 300, respectively, or into local server 400, or a computing device 500 (which could be a laptop, smartphone or tablet). The user would identify two control points in the BIM model that are in the area of the jobsite where the positional tracking system 100 is to be used. These two or more control points are typically on a floor. The user would put control tracker 200 on the floor or wall (surfaces S) at a location corresponding to one of the control points, and orient the control tracker 200 so that laser line 200LL intersects the second control point.

Preferably, the BIM model (or a portion thereof) can be displayed on the display 205, display 305, and/or displays of local server 400 and/or computing device 500. The user can select the first control point as the location of control tracker 200 and the second control point intersected by laser line 200LL. The positional tracking system 100 can then calculate the position and orientation of the control tracker 200 relative to laser transmitter 110, and correlate the X-, Y- and Z-coordinates of the control tracker 200 to the BIM model.

Another method of correlating the BIM model to the actual physical jobsite could be mounting control tracker 200 in a visible location, contacting one control point in the actual physical jobsite with point 300PEP, selecting such point in the BIM model, then contacting another control point in the actual physical jobsite with point 300PEP, and selecting such point in the BIM model. By having at least two points in the BIM model correlated with two known control points in the actual physical jobsite, the entire BIM model is correlated to the actual physical jobsite.

Once the control locations in the BIM model have been correlated to locations in the actual physical jobsite, the user can easily locate other locations called for in the BIM model in the actual physical jobsite. The user would upload a list of desired locations unto layout indicator 300. The display 305 preferably shows the list of desired locations. The user would select a desired location. Because controller 302 knows the X-Y- and Z-coordinates of point 300PEP as well as the orientation of housing 300H (and thus the orientation of display 305), it can calculate which direction the layout indicator 300 should be moved to in order to move towards the desired location. Display 305 can show the direction to move by showing arrows and providing an indication as to when the desired location has been reached.

The user can then mark the desired location with spray paint or chalk. Persons skilled in the art shall recognize that pole 300P may have a marking device 300PM (such as a chalk tip, a grease pen, a marker, a punch, etc.) disposed in end 300PE to mark the desired position.

Persons skilled in the art will recognize that, because the locational calculations are preferably conducted by layout indicator 300, several layout indicators 300 can be used at the same time. Therefore, multiple users can be marking out desired locations at the same time. This provides for substantial time savings compared with the prior art methods.

Persons skilled in the art shall recognize that layout indicator(s) 300 can send their location information to local server 400 (and thus computing device 500). Such information can be updated in real time. Preferably the location of layout indicator(s) 300 can be shown in a map displayed by local server 400 and/or computing device 500. Local server 400 and/or computing device 500 can store the movement path of the different layout indicator(s) 300. Such movement paths can be analysed to determine whether the user of such particular layout indicator 300 was being time-efficient in locating the different desired positions, etc.

Because positional tracking system 100 may be used over several days in the same jobsite, it is preferable to attach base 200B to a semi-permanent position, so as to avoid having to conduct the entire correlation process of correlating the BIM model to the physical jobsite multiple times. As mentioned above, control tracker 200 may have at least one IMU sensor 204, 214 to sense when the control tracker 200 has been bumped, moved, etc. If such movement has been detected, laser transmitter 110, control tracker 200, layout indicator 300, local server 400 and/or computing device 500 can provide or display an alert or notification, notifying the user that the control tracker 200 should be readjusted.

Because positional tracking system 100 may be used over several days in the same jobsite, it is desirable for the base bodies 200BB of the multiple control trackers 200 to store an individual ID number (possibly a universally unique ID (UUID) number) for the corresponding base body 200BB in the corresponding memory 213. This would allow the users to collect housings 200H at the end of the work day, then dispose them on base bodies 200BB on the next work day without having to use the same housings 200H used on the previous work day. Control tracker 200 would just check in the memory 213 for the ID number and correlate its position to the location noted for such base body 200BB in the BIM model file.

Figure 6:
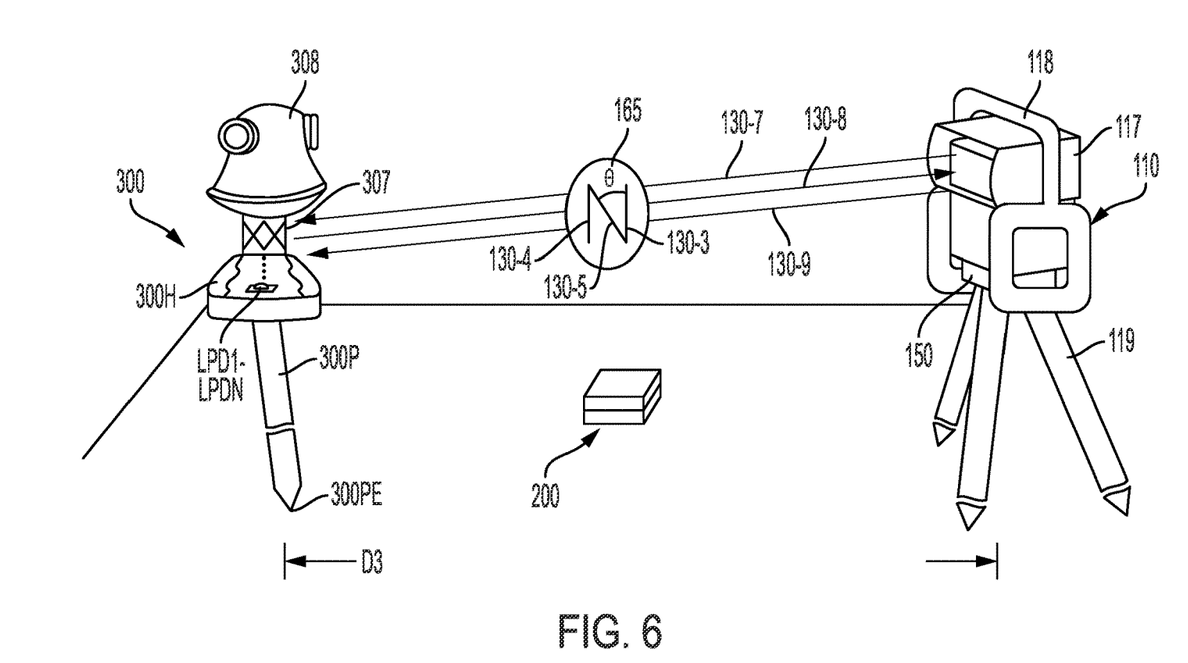
FIG. 6 is a perspective view of a second embodiment of the positional tracking system.

FIG. 6 shows a second embodiment of layout indicator 300, where like numerals refer to like parts. The second embodiment of layout indicator 300 differs from the first embodiment of layout indicator 300 as discussed below.

A retroreflective material, such as retroflective prism 307, is preferably disposed on housing 300H. The retroreflective prism 307 preferably reflects searching light and measuring light from a laser transmitter 110 in the range of 360 degrees in a horizontal plane. Information on reflective prism 307 can be found in US Patent Publication Nos. 20160202058 (published on Jul. 14, 2016 and entitled "Surveying Instrument") and 20150116693 (published on Apr. 30, 2015 and entitled "Three-Dimensional Measuring Method And Surveying System"), which are wholly incorporated by reference.

When laser transmitter 110 transmits the laser beam 130-7, it is reflected by prism 307 back to laser transmitter 110 as beam 130-8. Laser transmitter 110 reflects such beam back to layout indicator 300 as beam 130-9. Beam 130-9 is then received by prism 307 and directed towards photo diodes LPD1-LPDN. Persons skilled in the art shall recognize that having the laser beam being reflected multiple times facilitates measuring the time of flight of the beam, which would be used in calculating distance D3.

In order to calculate azimuth angle, elevation and roll (or tilt angle), it is desirable to provide a camera 308 on layout indicator 300. Preferably camera 308 is a 360 degree camera that can capture images via at least two or more camera inputs. As the laser transmitter 110 rotates the laser beam 130-7, at least one of the camera inputs will capture images of the laser beam 130-7.

By combining the positional information of laser beam 130-7 within the image field along with information from IMU sensor 304, the layout indicator 300 can calculate the angle axis representations, quaternions, Euler angles or yaw/pitch/roll of housing 300H in order to know the orientation of housing 300H relative to laser transmitter 110. Persons skilled in the art are referred to US Publication No. US 2017/0284790, which are fully incorporated herein by reference, for further information on such calculations.

Figure 10A:
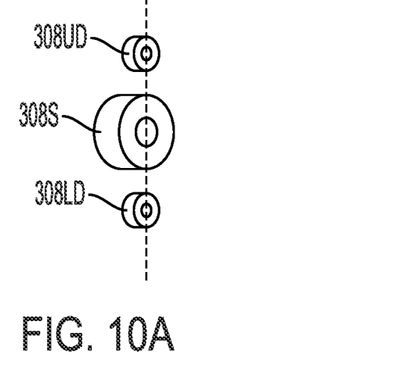
FIGS. 10A-10B illustrate components and outputs of the camera 308 in the second embodiment of the positional tracking system of FIG. 6, where the camera is in a first orientation.

Such calculations can be facilitated by adding components to camera 308. Referring to FIGS. 10A-11B, camera 308 may have an image sensor 308S disposed between an upper photodiode 308UD and a lower photodiode 308LD. Preferably, the image sensor 308S, upper photodiode 308UD and lower photodiode 308LD are aligned in a line, preferably a vertical line, as shown in FIG. 10A.

Figure 10B:
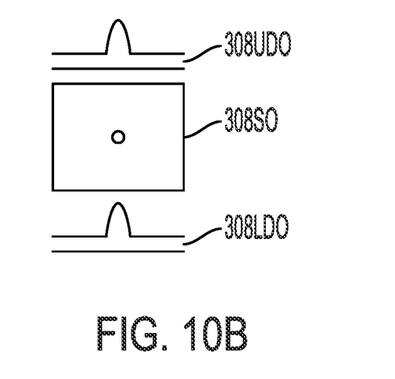

With such arrangement, as laser beam 130-7 passes across camera 308, the different components 130-3, 103-4, 130-5 of the laser beam 130-7 will pass across the image sensor 308S, upper photodiode 308UD and lower photodiode 308LD. As such components 130-3, 103-4, 130-5 pass across the image sensor 308S, upper photodiode 308UD and lower photodiode 308LD, the image sensor 308S, upper photodiode 308UD and lower photodiode 308LD will respectively output the image 308SO and the signals (graphed relative to time) 308UDO, 308LDO.

Persons skilled in the art will recognize that, due to the relative brightness of the laser 130-7, the image 308SO captured image sensor 308S would typically show only as a dot (or pixel(s)) within the image field of image 308SO. The distance of the dot from the vertical (left, right) edges can be used to determine the yaw angle, i.e., the angle between the transmitter 110 and laser receiver 300 along a horizontal plane. Alternatively, the horizontal distance of the dot from a center point can also be used to determine the yaw angle. Similarly, the distance of the dot from the horizontal (top, bottom) edges can be used to determine the pitch angle, i.e., the angle between the transmitter 110 and laser receiver 300 along a vertical plane. Alternatively, the vertical distance of the dot from a center point can also be used to determine the pitch angle.

Figure 11A:
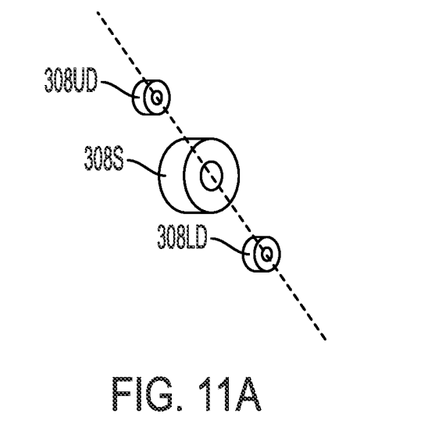
FIGS. 11A-11B illustrate components and outputs of the camera 308 in the second embodiment of the positional tracking system of FIG. 6, where the camera is in a second orientation.
Figure 11B:
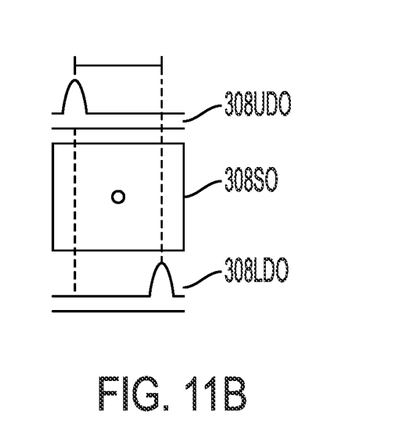

The tilt angle (or roll) of laser receiver 300 relative to transmitter 110 can be calculated by using the information received from the upper and lower photodiodes 308UD, 308LD. For example, if the upper and lower photodiodes 308UD, 308LD are aligned in a vertical line (as shown in FIG. 10A), the outputs 308*UDO*, 308LDO will be relatively similar (as shown in FIG. 10B), as the laser beam 103-7 will hit upper and lower photodiodes 308UD, 308LD at the same time. However, if the upper and lower photodiodes 308UD, 308LD are aligned in an inclined line (as shown in FIG. 11A), the outputs 308UDO, 308LDO will not be aligned. As shown in FIG. 11B, the laser beam 103-7 would hit upper photodiode 308UD first, then lower photodiode 308LD later. The system can use the time differential between the detected hits to calculate the tilt angle (or roll) of the laser receiver 300 relative to transmitter 110.

Figure 12:
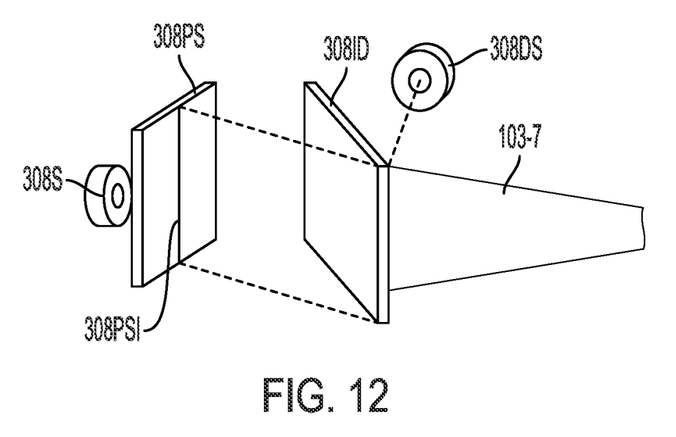
FIG. 12 illustrates an alternative component arrangement for camera 308 in the second embodiment of the positional tracking system of FIG. 6.

FIG. 12 shows an alternative component arrangement for camera 308, where like numerals refer to like parts. As before, laser beam 103-7 is rotated across camera 308. Laser beam 103-7 may be projected through an image divider 308ID. Part of the beam is reflected into an image sensor 308DS. As before, image sensor 308DS will generate an image (not shown) with a dot, which can be used to calculate the yaw and pitch angles.

Another part of the beam is preferably projected unto a projection screen 308PS. The beam will show as a line 308PSI on projection screen 308PS. Such image is captured by image sensor 308S. Unlike the image captured by image sensor 308DS, the image captured by image sensor 308S will show a line in the image field. The tilt angle (or roll) of the laser receiver 300 relative to transmitter 110 can be calculated by determining the angle of the line image relative to the image field.

Figure 13:
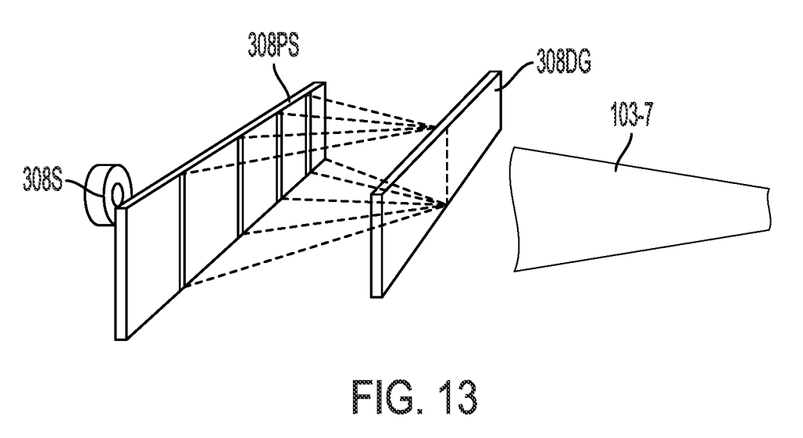
FIG. 13 illustrates another alternative component arrangement for camera 308 in the second embodiment of the positional tracking system of FIG. 6.

FIG. 13 illustrates another alternative component arrangement for camera 308, where like numerals refer to like parts. In this embodiment, a diffraction grating 308DG is disposed in front of projection screen 308PS. The diffraction grating 308DG basically splits the laser beam 103-7 into multiple parallel lines, which are projected unto projection screen 308PS and captured by image sensor 308S.

As in the previous embodiment, the tilt angle (or roll) of the laser receiver 300 relative to transmitter 110 can be calculated by determining the angle of the line image(s) relative to the image field. Furthermore, the yaw angle can be determined by calculating the distance between the vertical line images. In addition, if the laser beam(s) 103-7 and 103-8, or 103-8 and 103-9 are sent through a double-axis diffraction grating, the system can calculate the yaw and pitch angles by calculating the distance between the vertical and horizontal line images, respectively. Persons skilled in the art will note that the system may check whether the spacing between vertical (or horizontal) line images is the same or variable, as identical spacing would indicate a 0° angle, whereas variable spacing would indicate an angle that can be calculated by comparing the spacing between several lines.

Figure 7:
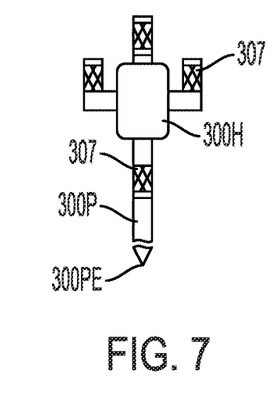
FIG. 7 is a front view of an embodiment of a layout indicator.

FIG. 7 shows a third embodiment of layout indicator 300, where like numerals refer to like parts. The third embodiment of layout indicator 300 differs from the first and second embodiments of layout indicator 300 as discussed below. Layout indicator 300 may have multiple prisms 307 (with corresponding photo diodes LPD1-LPD) on housing 300H and/or pole 300P. The information gathered from the multiple photo diodes can be used to calculate the distance from laser transmitter 110, location, elevation, angle axis representations, quaternions, Euler angles or yaw/pitch/roll of housing 300H.

Persons skilled in the art will also recognize that control tracker 200 may also be provided with at least one retroreflective prism 200P (similar to prism 307) and corresponding photo diodes (not shown but similar to photo diodes LPD1-LPD in layout indicator 300 shown in FIG. 6). The information gathered from the multiple photo diodes can be used to calculate the distance from laser transmitter 110, location, elevation, angle axis representations, quaternions, Euler angles or yaw/pitch/roll of housing 200H.

It will be understood that the above description and the drawings are examples of particular implementations of the invention, but that other implementations of the invention are included in the scope of the claims.

What is claimed is:

1. A position tracking system comprising:
a laser transmitter comprising a laser for emitting a laser beam, a controller controlling the laser, and a motor for rotating the emitted laser beam,
a control tracker comprising a housing, a power supply disposed within the housing that accepts power from a power tool battery pack connected thereto, a controller disposed within the housing, a memory connected to the controller, an inertial measurement unit (IMU) sensor providing information to the controller, a transceiver disposed within the housing, at least two photo diodes disposed on the housing, and a laser assembly for generating a beam to be projected unto a surface,
a layout indicator comprising a housing, a controller disposed within the housing, a memory connected to the controller, an inertial measurement unit (IMU) sensor providing information to the controller, a transceiver disposed within the housing, at least two photo diodes disposed on the housing, and a laser assembly, a local server in communication with at least one of the laser transmitter, the control tracker and the layout indicator.

2. The position tracking system of claim 1, wherein the layout indicator comprises a pole connected to the housing.

3. The position tracking system of claim 2, wherein the pole has an end.

4. The position tracking system of claim 3, wherein the end has a conical tip.

5. The position tracking system of claim 1, wherein the laser transmitter projects V- or N-shaped beams.

6. The position tracking system of claim 5, wherein at least one portion of the beams is modulated with azimuth angle data.

7. The position tracking system of claim 6, wherein the at least one portion of the beam is modulated using pulse width modulation, frequency modulation or phase modulation.

* * * * *